US011475381B2

(12) United States Patent  (10) Patent No.: US 11,475,381 B2
Dunne et al.  (45) Date of Patent: Oct. 18, 2022

(54) GRAPHICAL USER INTERFACE FOR RECEIVING PROPOSED AND DISPLAYING ALTERNATIVE COMPUTER ARCHITECTURES

(71) Applicant: International Business Machines Corporation, Armonk, NY (US)

(72) Inventors: Jonathan Dunne, Dungarvan (IE); Morten Kristiansen, Blanchardstown (IE); Jeffrey B. Sloyer, Fishersville, VA (US); Ian D. Stewart, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1186 days.

(21) Appl. No.: 13/726,370

(22) Filed: Dec. 24, 2012

(65) Prior Publication Data

US 2014/0181138 A1  Jun. 26, 2014

(51) Int. Cl.
  *G06F 16/00*  (2019.01)
  *G06F 7/00*  (2006.01)
  *G06Q 10/06*  (2012.01)
  *G06F 16/242*  (2019.01)

(52) U.S. Cl.
  CPC ....... *G06Q 10/0635* (2013.01); *G06F 16/242* (2019.01); *G06F 16/2428* (2019.01)

(58) Field of Classification Search
  CPC ......... G06F 17/30864; G06F 17/30867; G06F 17/30286; G06F 17/30595; G06F 16/2428; G06F 16/242; G06F 16/248; G06F 16/2423; G06Q 30/02; G06Q 10/0635
  USPC ................ 707/769; 717/168, 174; 705/7.28; 715/734
  See application file for complete search history.

(56) References Cited

U.S. PATENT DOCUMENTS

| 7,359,865 | B1 |  | 4/2008 | Connor et al. |
| 8,046,755 | B2 |  | 10/2011 | Gaa-Frost et al. |
| 8,180,724 | B1 |  | 5/2012 | Qureshi et al. |
| 8,880,801 | B1 | * | 11/2014 | Robins ................ G06F 11/1092 711/114 |
| 2003/0037327 | A1 | * | 2/2003 | Cicciarelli ................ G06F 8/61 717/178 |
| 2003/0172145 | A1 | * | 9/2003 | Nguyen .............. H04L 12/1403 709/223 |
| 2003/0229890 | A1 | * | 12/2003 | Lau ........................... G06F 8/65 717/168 |

(Continued)

OTHER PUBLICATIONS

U.S. Appl. No. 14/024,711, Non-Final Office Action, dated Apr. 23, 2014, 16 pg.

*Primary Examiner* — Raquel Perez-Arroyo
(74) *Attorney, Agent, or Firm* — Cuenot, Forsythe & Kim, LLC

(57) ABSTRACT

Risk assessment for a computing system being developed can include receiving a user input specifying a proposed topology for a computing system. The proposed topology is defined by a first software product to be used and an architecture having a first non-functional component. A problem knowledge repository is searched using a processor for records of problems correlated with the proposed topology. A level of risk in implementing the computing system using the proposed topology is calculated according to the searching using the processor.

16 Claims, 4 Drawing Sheets

(56) References Cited

U.S. PATENT DOCUMENTS

| | | | | |
|---|---|---|---|---|
| 2005/0102195 A1* | 5/2005 | Kuehr-McLaren | .... | G06Q 40/04 705/26.2 |
| 2007/0157195 A1* | 7/2007 | Gaa-Frost | ................. | G06F 8/60 717/174 |
| 2009/0183028 A1* | 7/2009 | Arnold | ................... | G06Q 10/06 714/16 |
| 2011/0161952 A1* | 6/2011 | Poddar | .................... | G06F 9/455 717/173 |
| 2013/0204837 A1* | 8/2013 | Sabharwal | .............. | G06F 16/23 707/609 |
| 2013/0232480 A1* | 9/2013 | Winterfeldt | ........... | G06F 9/5072 717/177 |
| 2013/0311229 A1* | 11/2013 | Hadar | ................ | G06Q 10/0635 705/7.28 |
| 2014/0181139 A1 | 6/2014 | Dunne et al. | | |

\* cited by examiner

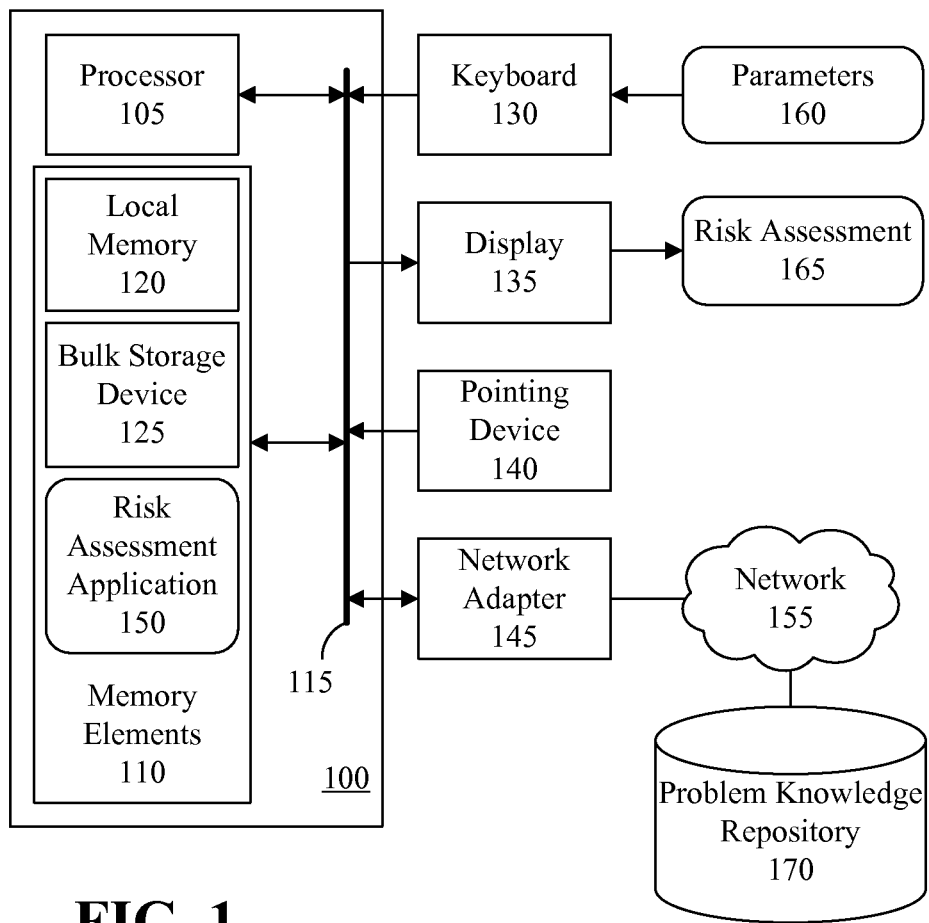

300

| Name | Version | Usage |
|---|---|---|
| Company A HTTP Server | 8.0 | • Application |
| Company B Active Directory | 2009 R2 | • Application |
| Company C Database | Rel. 2 11.2 | • Application |

400

| Name | Version |
|---|---|
| Company A Team Collaboration | 8.5.1 |
| Company B Mail Server | 2007 SP1 |
| Company A Web Portal | 7.0.0.1 |

500

> Deployment Risk Assessment
>
> The level of risk has been calculated as:
>
> Medium
>
> The following known issues relate to your proposed configuration:
>
> 1. Additional configuration and tuning required to enable Active directory LDAP's with product A (connections) (click for more details)
>
> 2. If configuring SSO between connections and Websphere Portal please use the following URL (click here for more details)
>
> An Alternate Topology with a lower level of risk is available. Would you like to view the topology?
>
> [ Yes ]   [ No ]

FIG. 6

GRAPHICAL USER INTERFACE FOR RECEIVING PROPOSED AND DISPLAYING ALTERNATIVE COMPUTER ARCHITECTURES

BACKGROUND

When building an enterprise-class computing system, customers typically purchase multiple software products as opposed to a single, software product offering. The different software products that are purchased are expected to interoperate with each other to provide the customer with a solution that offers a value greater than the sum of the individual components. Software products are typically deployed on, or utilize, one or more other software components called "non-functional components." Non-functional components are sometimes referred to as "middleware." Examples of non-functional components include, but are not limited to, database servers, Lightweight Directory Access Protocol (LDAP) servers, application servers, active directory servers, HyperText Transfer Protocol (HTTP) servers, and the like.

Thus, not only must applications interoperate with each other seamlessly, the non-functional components upon which the applications execute also must interoperate without issue. Unfortunately, due to the many different product offerings available and the need to integrate new software components with existing software components, seamless operation can be difficult to achieve.

BRIEF SUMMARY

A method includes receiving a user input specifying a proposed topology for a computing system, wherein the proposed topology is defined by a first software product to be used and an architecture having a first non-functional component. The method further includes searching, using a processor, a problem knowledge repository for records of problems correlated with the proposed topology and calculating, using the processor, a level of risk in implementing the computing system using the proposed topology according to the searching.

A system includes a processor programmed to initiate executable operations. The executable operations include receiving a user input specifying a proposed topology for a computing system, wherein the proposed topology is defined by a first software product to be used and an architecture having a first non-functional component. The executable operations further include searching a problem knowledge repository for records of problems correlated with the proposed topology and calculating a level of risk in implementing the computing system using the proposed topology according to the searching.

A computer program product for assessing risk of implementing a computing system includes a computer readable storage medium having program code stored thereon. The program code is executable by a processor to perform a method. The method includes receiving, using the processor, a user input specifying a proposed topology for a computing system, wherein the proposed topology is defined by a first software product to be used and an architecture having a first non-functional component. The method further includes searching, using the processor, a problem knowledge repository for records of problems correlated with the proposed topology and calculating, using the processor, a level of risk in implementing the computing system using the proposed topology according to the searching.

BRIEF DESCRIPTION OF THE SEVERAL VIEWS OF THE DRAWINGS

FIG. 1 is an example of a risk assessment system.

FIG. 2 is an example of a window of a user interface (UI) generated by the risk assessment system of FIG. 1.

FIG. 6 is another example of a window of the UI generated by the risk assessment system of FIG. 1.

DETAILED DESCRIPTION

Figures 3, 4, 5:
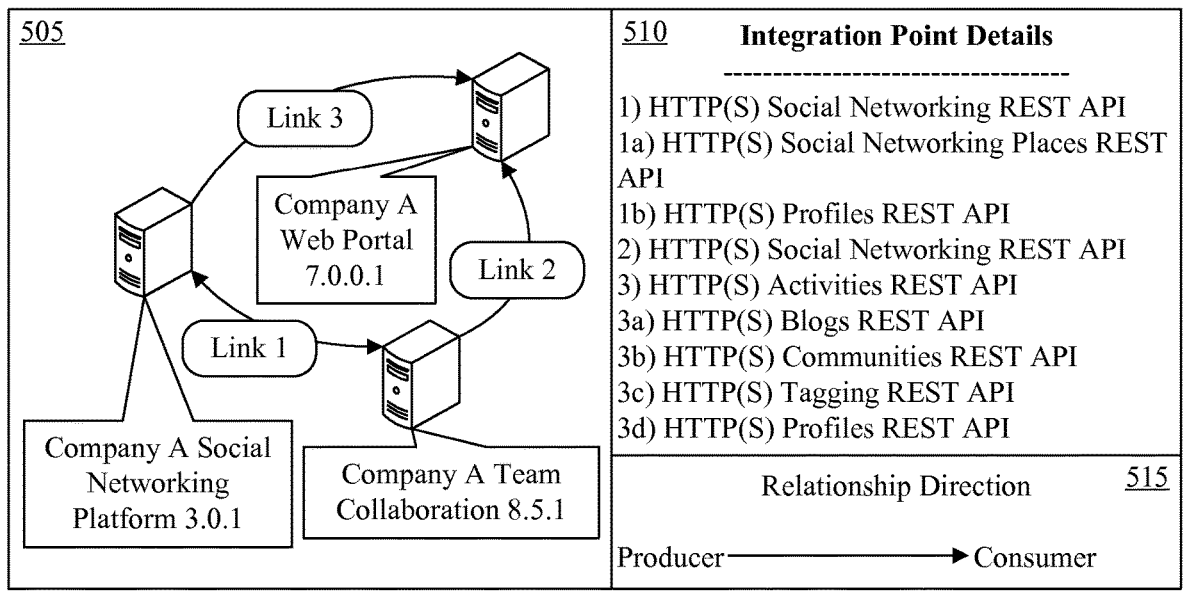
FIG. 3 is another example of a window of the UI generated by the risk assessment system of FIG. 1.
FIG. 4 is another example of a window of the UI generated by the risk assessment system of FIG. 1.
FIG. 5 is another example of a window of the UI generated by the risk assessment system of FIG. 1.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied, e.g., stored, thereon.

Any combination of one or more computer-readable medium(s) may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

This specification relates to building a computing system and, more particularly, to estimating a level of risk associated with building, deploying, and/or operating the computing system. In accordance with the inventive arrangements disclosed within this specification, a risk assessment can be determined for the computing system. The risk assessment, which includes a calculated level of risk, is determined from one or more parameters provided by way of one or more user inputs. The risk assessment and the level of risk provides a user with information relating to likely difficulties in building, deploying, and operating the computing system prior to actual implementation. In some cases, an alternative topology for the computing system having a lower level of risk is automatically determined and suggested. Further aspects are described below within this specification with reference to the drawings.

FIG. 1 is an example of a risk assessment system (system) 100. System 100 includes at least one processor (e.g., a central processing unit) 105 coupled to memory elements 110 through a system bus 115 or other suitable circuitry. As such, system 100 can store program code within memory elements 110. Processor 105 executes the program code accessed from memory elements 110 via system bus 115. In one aspect, for example, system 100 is implemented as a computer or other programmable data processing apparatus that is suitable for storing and/or executing program code. It should be appreciated, however, that system 100 can be implemented in the form of any system including a processor and memory that is capable of performing and/or initiating the functions and/or operations described within this specification.

Memory elements 110 include one or more physical memory devices such as, for example, local memory 120 and one or more bulk storage devices 125. Local memory 120 refers to RAM or other non-persistent memory device(s) generally used during actual execution of the program code. Bulk storage device(s) 125 can be implemented as a hard disk drive (HDD), solid state drive (SSD), or other persistent data storage device. System 100 also can include one or more cache memories (not shown) that provide temporary storage of at least some program code in order to reduce the number of times program code must be retrieved from bulk storage device 125 during execution.

Input/output (I/O) devices such as a keyboard 130, a display 135, and a pointing device 140 optionally are coupled to system 100. The I/O devices are coupled to system 100 either directly or through intervening I/O controllers. One or more network adapters 145 also are coupled to system 100 to enable system 100 to become coupled to other systems, computer systems, remote printers, and/or remote storage devices through intervening private or public networks such as network 155. Modems, cable modems, wireless transceivers, and Ethernet cards are examples of different types of network adapters 145 that can be used with system 100.

As pictured in FIG. 1, memory elements 110 store a risk assessment application 150. Risk assessment application 150, being implemented in the form of executable program code, is executed by system 100 and, as such, is an integrated part of system 100. Risk assessment application 150 specifies the instructions that, when executed, cause system 100 to perform and/or initiate the operations and/or functions described within this specification. Risk assessment application 150, parameters 160, risk assessment 165, and data contained in problem knowledge repository 170 are functional data structures that impart functionality when employed as part of system 100.

As pictured, system 100 is communicatively linked with problem knowledge repository 170 through network 155. Network 155 can be implemented as, or include, any of a variety of different networks such as a WAN, a LAN, a wireless network, a mobile network, a Virtual Private Network (VPN), the Internet, or the like.

Problem knowledge repository 170 is a data storage device that includes one or more records relating to one or more computing systems. Problem knowledge repository 170 can represent one database or a collection of two or more databases that can be queried by system 100. Examples of the types of records stored within problem knowledge repository 170 include critical situation records detailing critical problems experienced in implementing computing systems, e.g., internally within an organization and/or at customer sites, product management records specifying defects in products and, in particular software products, or the like.

For example, problem knowledge repository 170 can store records relating to different computing systems that were installed and/or tested. Accordingly, problem knowledge repository 170 includes information relating to a wide range of permutations of non-functional components that have been tested and validated. In illustration, problem knowledge repository 170 includes information specifying which combinations of different non-functional components (including specific implementations and/or versions thereof) are the most commonly used in installed computing systems. Problem knowledge repository 170 further includes data indicating which new versions of non-functional components have become available since a given date or since a particular software release of a selected software product. Problem knowledge repository 170 further includes information relating to problems experienced by previous customers using particular combinations of non-functions components and cost.

It should be appreciated that while problem knowledge repository 170 is illustrated as being separate and distinct from system 100, problem knowledge repository 170 can be included within system 100. Alternatively, as pictured, problem knowledge repository 170 can be included within a different computing system and/or server, exist as a stand-alone data storage appliance or network attached device. The embodiments disclosed within this specification are not intended to be limited by the particular implementation of problem knowledge repository 170 or examples presented.

In operation, system 100, while executing risk assessment application 150, receives one or more parameters 160. Parameters 160, in general, can be user provided and specify various features of a computing system that has not yet, but is to be built. Parameters 160, taken collectively, define a proposed topology for the computing system that is to be built. The computing system that is to be built is one that is still in the planning stage. Further, the computing system can be one that is considered an enterprise-class computing system that will include two or more different software components expected to interact with one another.

System 100 evaluates parameters 160, which collectively define the proposed topology for the computing system to be built, and searches problem knowledge repository 170 for one or more records that have a correlation with one or more of parameters 160. For example, one or more or all of parameters 160 can be used as search terms or can be used to derive search terms to be used in searching, e.g., querying, records contained in problem knowledge repository 170. Based upon the records located from the searching, system 100 generates a risk assessment 165. Risk assessment 165 includes a level of risk that is calculated for the computing system as generally defined by parameters 160.

FIG. 2 is an example of a window 200 of a user interface (UI) generated by system 100. Window 200, as is the case with each of the windows described with reference to FIGS. 2-6, is displayed upon display 135 of system 100. Through window 200, a user provides one or more parameters, e.g., parameters 160, defining the computing system that is to be evaluated for risk.

Window 200 is configured to allow a user to specify one or more software products that are to be installed in the computing system. In region 205, a user input is received that specifies a particular software product that is to be installed and/or used within the computing system being built. In this example, the user indicates that a product called "Company A Social Networking Platform" is to be used. In region 210, a user input is received specifying the particular version, e.g., 3.0.1, of the software product specified in region 205.

In region 215, a user input is received that specifies an architecture for the computing system. In general, the architecture is defined by one or more nodes. In one aspect, one or more or all nodes specified represent a non-functional component of the computing system. A non-functional component refers to a software component that is part of the software support infrastructure of the computing system. Non-functional components are typically referred to as "middleware." Examples of non-functional components include, but are not limited to, a database server, a Lightweight Directory Access Protocol (LDAP) server, an application server, an active directory server, a HyperText Transfer Protocol (HTTP) server, etc. Non-functional components are software components that are deployed to support applications. The applications are deployed "on top of" (e.g., execute on or within) or utilize the non-functional components to operate and/or execute.

Accordingly, the architecture of a computing system lists the non-functional components to be used in building the computing system. Further attributes of the architecture that can be specified for each non-functional component in region 215 include whether the node is clustered or not, i.e., an individual server. When a non-functional node is clustered, the number of servers in the cluster optionally can be specified.

Nodes of an architecture also can represent a functional component in reference to a particular software product that runs either "on top of," "within," or "in combination with" a non-functional component. For example, a functional component can represent a software product, e.g., an application, executing within an application server type of non-functional component. Thus, in another aspect, the architecture further specifies one or more functional components.

Further parameters of the architecture indicate the type of the non-functional component that is to be used. As shown in region 215, the nodes included are an application server, an HTTP server, a database server, and an LDAP server. In region 215, the application server, the HTTP server, the database server, and the LDAP server each is an example of a different type of non-functional component. Further parameters illustrated in region 215 as part of the architecture include the HTTP server, the LDAP server, and the database server each being "remote."

The user can enter one or more additional software products by entering data into further rows of window 200 as indicated by the instructional text "Add proposed products."

FIG. 3 is an example of a window 300 of the UI generated by system 100. Window 300 is configured to receive user inputs specifying further ones of parameters 160 defining the computing system to be built. Using window 300, a user can define a particular implementation for one or more or all of the non-functional components specified as part of the architecture in FIG. 2.

The first column called "Name" lists the particular software product to be used in implementing a given non-functional component specified as part of the architecture in FIG. 2. Appreciably, each name is specific to, or indicative of, the vendor that provides the software product. The second column entitled "Version" specifies the particular version of the software product to be used. The last column entitled "Usage" specifies the way in which the software product, in this case a non-functional component, is to be used or what the software product is to support.

For the remote HTTP server, a "Company A HTTP Server" of version 8.0 is selected. The remote HTTP server is to be used to support an application. For the remote LDAP server, a "Company B Active Directory" of version 2009 R2 is selected. The LDAP server is to support an application. For the remote database server, a "Company C Database" of version Rel. 2 11.2 is selected. The remote database server is to support an application.

FIG. 4 is an example of a window 400 of the UI generated by system 100. Window 400 is configured to receive user inputs specifying further ones of parameters 160 defining the computing system to be built. Using window 400, a user can identify or select other software products that are to be integrated or included within the computing system to be built. In one example, the various software products listed in window 400 are software products the owner or manager of the computing system to be built already owns or has in service, e.g., are existing software products. The first column entitled "Name" lists the name of the software product that is to be included in the computing system. The second column entitled "Version" specifies the particular version of each software product listed in the first column.

FIG. 5 is an example of a window 500 of the UI generated by system 100. In general, FIG. 5 illustrates a high level architectural diagram of the proposed topology which can be drawn or specified by a user. Within the architectural diagram, one or more different integration points between components are shown. The integration points can be further defined by the application programming interfaces specified.

Window 500 includes regions 505, 510, and 515. Each of regions 505 and 510 is configured to receive user inputs specifying further ones of parameters 160 defining the computing system to be built. Region 515 is a key or legend indicating how to interpret the various communication links labeled as "Link 1," "Link 2," and "Link 3" within region 505. Per region 515, the producer of data is at the tail of arrow representing the communication link while the consumer of data is at the head of arrow.

Within region 505, a user can draw a picture or visualization of the architecture to be used. As shown, a user has drawn an architecture, in the form of an architectural diagram, of a proposed topology including three nodes represented as servers. While the nodes are illustrated in region 505 using visualizations of physical computers, each node represents a software product or component. Once the nodes of the architecture are drawn, the user can annotate each node with the particular software product implemented within the node. In addition, the user can draw communication link illustrating the flow of information between the various nodes. The user further can assign a label or identifier to each node and also to each communication link.

Each of the communication links is defined by two nodes, or endpoints. For example, communication link 1 is defined by the node annotated as "Company A social Networking Platform 3.0.1" and the node annotated as "Company A Team Collaboration 8.5.1." With each communication link being labeled, the user can enter further parameters defining the communication links within region 510. For example, for each communication link, the user is able to specify an integration point for each end (e.g., tail and head) of the communication link.

From an end user perspective, an integration point appears as the ability of the user to access functionality from two or more components from a unified and/or integrated type of UI. An example of an integration point includes an instant messaging software product used in combination with a social collaboration software product where the user is able to access the functionality of both through a UI. From a system architecture perspective, the same integration point may utilize one or more common application programming interfaces (APIs) to ensure that each software component is able access a common transport system to communicate with the other over the communication link despite the possibility that each individual software component forming an endpoint uses different internal transports. In terms of FIG. 5, the integration point for both software components may be represented as a communication link and an associated, and common, API.

As such, an integration point is generally defined by the API used by a node to communicate with the node at the other end of the communication link. Referring to Link 1, for example, the integration point details labeled "1," "1a," and "1b" indicate the APIs that are used for link 1 between the node labeled "Company A Social Networking Platform 3.0.1" and "Company A Team Collaboration 8.5.1".

For each link, the user can enter further parameters not pictured in FIG. 5. Table 1 below includes additional parameters that can be entered and associated with particular links, and thus, nodes, of the architecture. The parameters shown in Table 1 can be included or selected for inclusion in each respective "link" rounded box annotating or labeling each link or within region 510. In one aspect, table 1 illustrates a use case as the particular function to be performed by each node is defined.

TABLE 1

| Link | Parameters |
|---|---|
| 1 | Activities: Publish attachments. Communities: Create with Quickr Teamspace & Wiki. News Feeds: Read feeds. Business Card in connections consumed by Quickr |
| 2 | Portlets: Places, Catalog, Quickr. Document Search, Quickr Link Renderer. |
| 3 | Portlets: Activities, Blogs, Communities, Tagging, Profiles functionality. |

A use case includes one or more of the parameters, e.g., parameters 160, that define the purpose for which a user, or customer, would like to use a particular software product such as the software product to be installed. If, for example, the user specifies a social collaboration type of use case, the use case indicates that the user intends on using the social collaboration software product for a specific purpose. In one aspect, the use case can be specified with a generic purpose. In another aspect, the use case can specify a specific purpose that is tailored to the needs of the user. In either case, however, the purpose, as specified by the use case, for a software product such as a social collaboration software product is within the intended scope of use for the particular software product to be installed, e.g., social collaboration software in this case.

FIG. 6 is an example of a window 600 of the UI generated by system 100. Window 600 delivers, to the user, the risk assessment that is generated by system 100. As such, window 600 specifies the level of risk as "Medium." Additional issues that are located from searching the problem knowledge repository can be listed as well. In this example, two issues numbered consecutively as "1" and "2," which were found in the searching and have been provided. In one aspect, each issue located in the searching can be provided. In another aspect, only those deemed most important or most critical can be presented in window 600. Each of the issues listed can include a selectable portions, e.g., the "click here for more details," that, when selected causes the system to retrieve and display the source records providing additional detail for the issues listed.

In the example pictured in FIG. 6, system 100 has determined that an alternate topology has been found or determined that, while expected to meet user needs and/or requirements, is able to do so with a lower level of risk. As such, the user is provided with an opportunity to view the alternative topology and obtain further details relating to the alternative topology by selecting "Yes."

Figure 7:
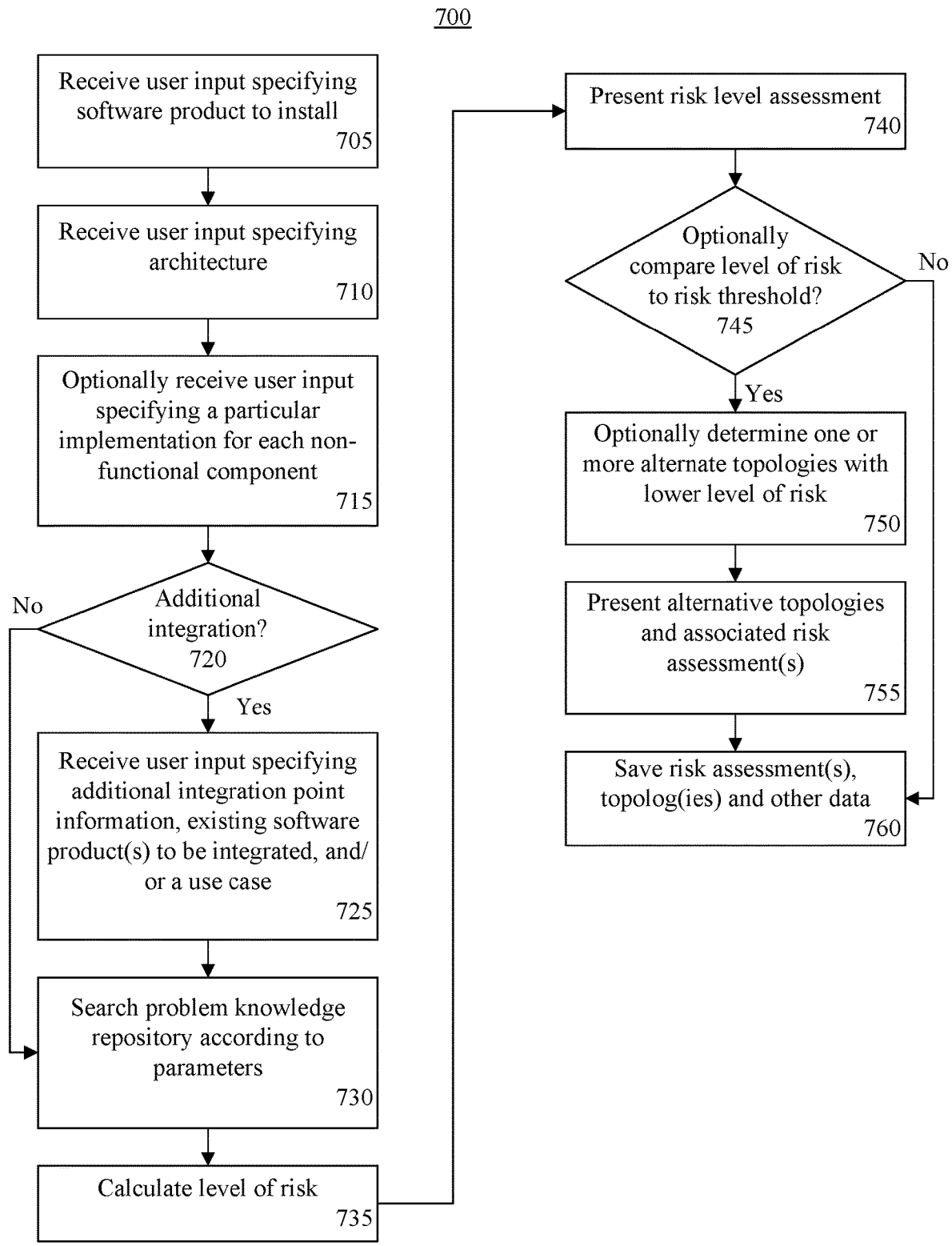
FIG. 7 is an example of a method of assessing risk of a computing system.

FIG. 7 is an example of a method 700 of assessing risk of a computing system. Method 700 is performed by a system such as system 100 of FIG. 1. Accordingly, method 700 can begin in block 705 where the system receives a user input specifying, as a parameter, a software product that is to be installed and/or used within the computing system being designed. The user input can be received through a UI as described with reference to FIG. 2.

Throughout the description of method 700, reference is made to particular windows of the UI as discussed within this specification. It should be appreciated, however, that the user inputs received that specify the various parameters used by the system can be received by any of a variety of different mechanisms and/or UIs. As such, reference to particular window of the UI within this specification and, in particular, in describing FIG. 7, is intended for the purpose of illustration and not limitation.

In block 710, the system receives a user input specifying, as a parameter, an architecture for the computing system being designed. The user input can be received through a UI as described with reference to FIG. 2. The parameters defining the architecture include, at a minimum, the type of the non-functional component(s) that are to be used. Further parameters indicating information such as whether a particular non-functional component is to be clustered or not, is remote, and the like optionally can be specified. In block 715, the system optionally receives a user input specifying, as a parameter, a specific implementation for one or more or each of the non-functional components that are to be used in the computing system. The user input can be received through a UI as described with reference to FIG. 3.

In block 720, the system determines whether additional integration is to be performed. For example, the system can query the user whether there are further parameters that are to be entered relating to the architecture previously specified and/or one or more other software products that are also to be utilized or incorporated into the computing system with the software product identified in block 705. If so, method 700 proceeds to block 725. If not, method 700 continues to block 730.

In block 725, the system receives one or more further user inputs specifying, as one or more additional parameters, information such as integration points for links that may be specified, one or more existing software products to be used in the computing system being designed, and/or a use case for the computing system. User inputs specifying one or more existing software products to be incorporated into the computing system can be received through a UI as described with reference to FIG. 4. User inputs specifying integration points and communication links can be received through a UI as described with reference to FIG. 5. The use case also can be specified using a UI as described with reference to FIG. 5. Table 1 illustrates the various details that, taken collectively, specify a use case for the computing system as the various functions or roles of the nodes of the architecture are defined.

In block 730, the system searches the problem knowledge repository for one or more records according to the parameters specified for the computing system being implemented. As noted, one or more or all of the parameters can be included or used within a query that is executed against the problem knowledge repository. Responsive to the query, any records matching one or more parameters and/or correlated with the query are returned.

In block 735, the system calculates a level of risk for implementing the computing system. The level of risk can be calculated in any of a variety of different ways. In one example, each record can include a level of risk or a severity level that can be used within an algorithm for calculating level of risk. The level of risk of each record can be specified in numeric form or in textual form, e.g., low, medium, or high. In the case of textual form, the textual level of risk can be translated into a numeric value, e.g., 1, 2, or 3.

In any case, the system can average the various indicators from the records. In another example, the system can apply different weights or multipliers to different records depending upon the particular database from which the record was found. In illustration, a higher multiplier may be used for each level of risk of records from a first database than is used for each level of risk of records from a second database of the problem knowledge repository. In another example, the records located by the search can be processed using semantic analysis to identify the severity of the records found. In that case, the severity can be assigned a numeric value. The values can be processed using a selected algorithm as described, e.g., averaged or using a weighted average. In still another example, the level of risk can be calculated using only the top "N" most critical records for the average and/or weighted average where N is a predetermined integer value. Thus, where N is 5, for example, the criticality level of the 5 most critical records located by the search are used.

In block 740, the system presents the user with a risk assessment. As noted, an example of a risk assessment is presented in FIG. 6. The risk assessment includes the level of risk calculated for the computing system being implemented. The risk assessment further can include a description of the located issues or records from the searching.

In block 745, the system optionally compares the level of risk of the proposed topology defined by the received parameters with a risk threshold. If the level of risk of the proposed topology exceeds the risk threshold, method 700 can proceed to block 750. If not, method 700 can continue to block 760.

In block 750, the system optionally determines one or more alternate topologies for the computing system that have a lower level of risk than was calculated in block 750 for the proposed topology. In one aspect, the system utilizes one or more parameters that are considered mandatory for the purpose of determining an alternate topology having a lower level of risk. For example, mandatory parameters can include the use case specified by the user. In another example, the mandatory parameters can be the software product to be installed and the supporting non-functional components with only type specified (e.g., not brand or company specific implementations of a non-functional component). In another example, the mandatory parameters can include one or more of the particular existing software products that the user wishes to incorporate into the computing system being developed. The mandatory parameters can be predetermined by the system. In another aspect, however, the user can designate which ones of the parameters are mandatory for the purpose of determining an alternate topology.

The alternate topology can include a different architecture than the architecture of the proposed topology. For example, the alternate topology can cluster a particular node that was not clustered in the proposed topology, use a different number of computing systems for the cluster, select a different implementation of a non-functional component to replace a particular non-functional component of the proposed topology, etc.

In block 755, the system presents the alternative topology or topologies and optionally the level of risk (and optionally an entire risk assessment) for each alternative topology determined. In block 760, any topologies and corresponding risk assessments for the computing system can be stored in a data storage device, e.g., a non-transitory data storage device, for later recall.

The following is an illustrative example of the operation of a risk assessment system described within this specification. Consider the case in which a customer wishes to install a new software product called Software Product A. The customer already has one or more other specific software products installed, potentially from different vendors, in use such as a database server and an LDAP server. The risk assessment system allows the customer to predict whether Software Product A can be installed within the existing computing environment and indicate the likely issues that will be experienced prior to deploying the final solution. The risk assessment system can indicate the likelihood of issues occurring during deployment, configuration and operational stages of the computing system.

Referring to the above scenario, consider the situation in which the customer wishes to deploy Software Product A using version 2003 of Operating System X. The customer would like to use an existing Brand Y LDAP server of version 2.3.1. Software Product A, however, may only have been validated with Brand Y LDAP server of version 2.3.0. In this example, the risk assessment system determines a level of risk for deploying the above computing system with Software Product A installed and can notify the user of the particular issues that are likely to be experienced.

In another example, Software Product A may only have been validated on version 2002 of Operating System X. In still another example, the particular database implementation either owned by the customer or being considered for purchase may have been validated with Software Product A in a single server environment, but not within a clustered environment, or only for clusters up to 5 nodes, but the customer proposes using 7 nodes in the cluster.

In another example, a version of a non-functional component may be determined to be outdated and require updating to reduce the level of risk of the computing system. In that case, the risk assessment system generates an alternative topology in which the non-functional component of the proposed topology is replaced with a newer version of the same particular implementation of the non-functional component used in the original proposed topology.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The corresponding structures, materials, acts, and equivalents of all means or step plus function elements in the claims below are intended to include any structure, material, or act for performing the function in combination with other claimed elements as specifically claimed. The description of the embodiments disclosed within this specification have been presented for purposes of illustration and description, but are not intended to be exhaustive or limited to the form disclosed. Many modifications and variations will be apparent to those of ordinary skill in the art without departing from the scope and spirit of the embodiments of the invention. The embodiments were chosen and described in order to best explain the principles of the invention and the practical application, and to enable others of ordinary skill in the art to understand the inventive arrangements for various embodiments with various modifications as are suited to the particular use contemplated.

What is claimed is:

1. A computer-hardware system including a risk assessment system, comprising:
    a hardware processor configured to initiate the following executable instructions:
        receiving, from a graphical user interface, identifications of non-functional and functional components of a computing system;
        receiving, from the graphical user interface, mandatory and additional parameters including definitions of communication links respectively between the non-functional and the functional components;
        displaying, in the graphical user interface, a proposed topology of the computing system generated using the mandatory and the additional parameters and the identifications of the non-functional and the functional components;
        receiving, from a problem knowledge repository database and based upon a search using search terms derived from the mandatory and the additional parameters, computer records correlated with the search terms; and
        presenting, via the graphical user interface, an alternative topology for the computing system automatically generated using only the mandatory parameters and based upon the alternative topology having a level of risk being lower than a level of risk of the proposed topology, wherein
    the definition of at least one of the communication links includes a plurality of common application programming interfaces, and
    the level of risk of each of the proposed topology and the alternative topology is generated by the risk assessment system using the computer records.

2. The computer-hardware system of claim 1, wherein the mandatory parameters are predetermined by the computer-hardware system.

3. The computer-hardware system of claim 1, wherein the graphical user interface is configured to permit a user to designate a parameter as a mandatory parameter.

4. The computer-hardware system of claim 1, wherein the graphical user interface is configured to present an interactive risk assessment associated with the level of risk of the proposed topology generated by the risk assessment system, and
    the interactive risk assessment includes selectable portions, which when selected, cause the graphical user interface to display source records used by the risk assessment system.

5. The computer-hardware system of claim 4, wherein the graphical user interface is further configured to present a risk assessment associated with the level of risk of the alternative topology.

6. The computer-hardware system of claim 1, wherein the proposed topology includes already-existing components of the computing system and proposed components for the computing system.

7. The computer-hardware system of claim 6, wherein the mandatory parameters include the already-existing components.

8. The computer-hardware system of claim 1, wherein the problem knowledge repository database includes:
    computer records identifying a plurality of non-functional components that have been tested and validated;
    computer records identifying a plurality of combinations of non-functional components and specific implementations therefor; and
    computer records identifying versioning information for the plurality of non- functional components.

9. A computer program product, comprising:
    a computer readable hardware storage device having program code stored thereon, the program code executable by a computer hardware system including a risk assessment system to perform the following:
        receiving, from a graphical user interface, identifications of non-functional and functional components of a computing system;
        receiving, from the graphical user interface, mandatory and additional parameters including definitions of communication links respectively between the non-functional and the functional components;
        displaying, in the graphical user interface, a proposed topology of the computing system generated using the mandatory and the additional parameters and the identifications of the non-functional and the functional components;
        receiving, from a problem knowledge repository database and based upon a search using search terms derived from the mandatory and the additional parameters, computer records correlated with the search terms; and
        presenting, via the graphical user interface, an alternative topology for the computing system automatically generated using only the mandatory parameters and based upon the alternative topology having a level of risk being lower than a level of risk of the proposed topology, wherein
    the definition of at least one of the communication links includes a plurality of common application programming interfaces, and
    the level of risk of each of the proposed topology and the alternative topology is generated by the risk assessment system using the computer records.

10. The computer program product of claim 9, wherein the mandatory parameters are predetermined by the computer-hardware system.

11. The computer program product of claim 9, wherein the graphical user interface is configured to permit a user to designate a parameter as a mandatory parameter.

12. The computer program product of claim 9, wherein the graphical user interface is configured to present an interactive risk assessment associated with the level of risk of the proposed topology generated by the risk assessment system, and the interactive risk assessment includes selectable portions, which when selected, cause the graphical user interface to display source records used by the risk assessment system.

13. The computer program product of claim 12, wherein the graphical user interface is further configured to present a risk assessment associated with the level of risk of the alternative topology.

14. The computer program product of claim 9, wherein the proposed topology includes already-existing components of the computing system and proposed components for the computing system.

15. The computer program product of claim 14, wherein the mandatory parameters include the already-existing components.

16. The computer program product of claim 9, wherein the problem knowledge repository database includes:
   computer records identifying a plurality of non-functional components that have been tested and validated;
   computer records identifying a plurality of combinations of non-functional components and specific implementations therefor; and
   computer records identifying versioning information for the plurality of non-functional components.

\* \* \* \* \*